(12) United States Patent
Hasunuma

(10) Patent No.: US 8,733,399 B2
(45) Date of Patent: May 27, 2014

(54) FLOW ADJUSTING VALVE

(75) Inventor: Masahiro Hasunuma, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 237 days.

(21) Appl. No.: 13/114,646

(22) Filed: May 24, 2011

(65) Prior Publication Data

US 2011/0291037 A1    Dec. 1, 2011

(30) Foreign Application Priority Data

May 28, 2010  (JP) ................................ 2010-122895

(51) Int. Cl.
*F16K 11/20* (2006.01)

(52) U.S. Cl.
USPC ......... 137/637.4; 251/14; 251/63.5; 251/122; 251/129.03; 251/129.11

(58) Field of Classification Search
USPC .......... 137/637.4; 251/14, 30.01, 30.04, 63.5, 251/122, 129.03, 129.11, 187
See application file for complete search history.

(56) References Cited

U.S. PATENT DOCUMENTS

| | | | | |
|---|---|---|---|---|
| 3,488,030 | A * | 1/1970 | Hulme et al. | ............ 251/129.12 |
| 3,540,462 | A * | 11/1970 | Renzi | ............................. 137/219 |
| 6,220,571 | B1 * | 4/2001 | Kim et al. | ...................... 251/284 |
| 6,994,308 | B1 * | 2/2006 | Wang et al. | ................ 251/30.04 |
| 7,090,190 | B2 * | 8/2006 | Yasue et al. | ................... 251/63.5 |
| 7,117,886 | B2 * | 10/2006 | Kajitani et al. | ............ 137/487.5 |
| 7,207,351 | B2 * | 4/2007 | Hayashi et al. | ............... 137/554 |
| 8,210,493 | B2 * | 7/2012 | Miyagawa et al. | .......... 251/63.5 |
| 8,292,262 | B2 * | 10/2012 | Hasunuma et al. | ...... 251/129.05 |
| 2008/0111089 | A1 * | 5/2008 | Hasunuma | .................... 251/122 |
| 2009/0072173 | A1 | 3/2009 | Hasunuma et al. | |
| 2009/0078038 | A1 * | 3/2009 | Ushigusa et al. | ............... 73/195 |
| 2010/0001221 | A1 * | 1/2010 | Hasunuma | .................... 251/318 |

FOREIGN PATENT DOCUMENTS

| | | |
|---|---|---|
| JP | 2003-294165 | 10/2003 |
| JP | 2006-153262 | 6/2006 |
| JP | 2008-008415 | 1/2008 |
| JP | 2010-014260 | 1/2010 |

OTHER PUBLICATIONS

Japanese Office Action, JP SN 2010-122895, dated Jan. 21, 2014 (including English Translation).

* cited by examiner

*Primary Examiner* — John K Fristoe, Jr.
*Assistant Examiner* — Matthew W Jellett
(74) *Attorney, Agent, or Firm* — Boyle Fredrickson, S.C.

(57) ABSTRACT

A needle valve that adjusts the flow of liquid fluid and an open/close valve that makes it possible to fully close a flow path of the liquid fluid are accommodated inside a casing of a flow adjusting valve. The needle valve is provided with a reciprocating movement section that adjusts the flow of the liquid fluid by moving a needle valve piece toward and away from the valve seat. The open/close valve is provided with an opening/closing section that utilizes a basal outer surface of the needle valve piece facing the valve seat as a fully-closing valve piece and that reciprocatingly moves the fully-closing valve piece, independently of the reciprocating movement section, between a closed position, where the fully-closing valve piece is in close contact with the valve seat, and an open position, where the fully-closing valve piece is moved away from the valve seat.

10 Claims, 7 Drawing Sheets ural fields, for example, chemical plants, semiconductor manufacturing, biotechnology, and so on, and that controls the flow of liquid fluid.

FLOW ADJUSTING VALVE

CROSS REFERENCE TO RELATED APPLICATIONS

This application claims benefit of Japanese Application No. 2010-122895 filed in Japan on May 28, 2010, the contents of which is hereby incorporated by its reference.

BACKGROUND OF THE INVENTION

1. Field of the Invention

The present invention relates to a flow adjusting valve that is employed in a fluid transfer pipe used in various industrial fields, for example, chemical plants, semiconductor manufacturing, biotechnology, and so on, and that controls the flow of liquid fluid.

2. Description of Related Art

Known flow adjusting valves in the related art that adjust the flow of liquid, such as chemicals, etc., include those that employ a needle valve, as disclosed in Japanese Unexamined Patent Application, Publication No. 2006-153262. With such flow adjusting valves, remote control of the degree of opening of the needle valve has also been implemented by providing a stepper motor that rotationally drives a shaft piece and a conversion mechanism that converts the rotation of the shaft piece to forward/backward movement of the shaft piece.

In addition, conventional flow adjusting valves include those in which an open/close valve that performs fully-opening/fully-closing operation serves as a main component and that is provided with an electrically powered flow adjusting function. With the open/close valves having such a flow adjusting function, it has been pointed out that precision of the flow adjustment itself deteriorates, that there is a problem with flow reproducibility due to changes in a valve seat shape, and that there is a problem with durability and strength because the motor is subjected to a piston load.

With the flow adjusting valves employing a needle valve, in order to maintain accurate flow adjustment, it is desirable to avoid the fully-closed operation, in which a needle valve is in close contact with a valve seat. That is, when the needle valve is in close contact with the valve seat, the shape of the valve orifice is deformed due to drag, friction, etc.; therefore, the original orifice shape (dimensions) cannot be maintained, and, as a result, accurate flow adjustment in accordance with the degree of opening (orifice shape) of the needle valve becomes difficult, causing the problem of the flow reproducibility.

Accordingly, when installing a flow adjusting valve in a fluid transfer pipe, an open/close valve (also referred to as a "shutoff valve") is normally installed in series with the flow adjusting valve, and this open/close valve is fully closed to perform the fully-closed operation to block fluid flow. The needle valve is not fully closed in this case, and a minimum necessary degree of opening for ensuring enough space so that the needle valve does not come in contact with the valve seat is set as the minimum degree of opening.

Note that, in the case in which the flow adjusting valve adjusts the flow by changing the degree of opening of the needle valve, the open/close valve is maintained in a fully-open state.

However, when the flow adjusting valve and the open/close valve are installed in series, particularly when the open/close valve is connected next to the flow adjusting valve in a lateral series in a horizontal pipe, the footprints of the valves themselves, that is, spaces required for installing the valves, become large. Therefore, size reduction of the apparatus as a whole is prevented.

Against such a background, there is a demand for a flow adjusting valve that has a flow adjustment function and a flow-path blocking function that fully closes a flow path. That is, there is a demand for reducing an installation space by implementing the flow-path blocking function in a flow adjusting valve employing a needle valve, without losing the flow reproducibility.

BRIEF SUMMARY OF THE INVENTION

The present invention has been conceived in light of the above-described circumstances, and an object thereof is to provide a flow adjusting valve that is provided with a flow adjustment function and a flow-path blocking function.

In order to solve the above-described problems, the present invention employs the following solutions.

A flow adjusting valve according to the present invention is a flow adjusting valve in which a needle valve that adjusts the flow of liquid fluid and an open/close valve that makes it possible to fully close a flow path of the liquid fluid are accommodated inside a casing in which a fluid flow path and a valve seat are formed, wherein the needle valve is provided with a reciprocating movement section that adjusts the flow of the liquid fluid that flows in the flow path by moving the needle valve piece toward and away from the valve seat; and the open/close valve is provided with an opening/closing section that utilizes a basal outer surface of the needle valve piece facing the valve seat as a fully-closing valve piece and that reciprocatingly moves the fully-closing valve piece, independently of the reciprocating movement section, between a closed position, where the fully-closing valve piece is in close contact with the valve seat, and an open position, where the fully-closing valve piece is moved away from the valve seat.

With the flow adjusting valve according to the present invention, the needle valve that adjusts the flow and the open/close valve that makes it possible to fully close the fluid flow path are accommodated in the same casing, and, moreover, the flow adjustment by the needle valve via the reciprocating movement section and fully closing/fully opening of the open/close valve by the opening/closing section are independent of each other; therefore, a structure is obtained wherein the installation space therefor is small and a main flow adjusting structure employing a needle valve that enables precise flow adjustment is provided with a function of completely blocking (fully closing) a flow path. In addition, because the opening/closing section for the open/close valve is independent of the reciprocating movement section, a response lag is eliminated and the response time can be shortened.

In the flow adjusting valve according to the first aspect of the present invention, the reciprocating movement section may be driven by a stepper motor, and the opening/closing section is driven by air pressure.

In the first aspect of the present invention, it is desirable that the reciprocating movement section be provided with a converter that converts rotational movement of the stepper motor to reciprocating movement in an axial direction, a slider that reciprocatingly moves in the axial direction integrally with the needle valve piece by being engaged with a shaft portion of the needle valve piece loosely fitted to the converter, and an elastic member that biases the slider in a direction in which the slider is pressed against the converter; that the opening/closing section be provided with a piston that moves at an outer surface of the converter by being pressed by the air pressure in one of the axial directions and an elastic member that biases in a direction that moves the piston by pressing the piston in the other axial direction; that the slider that reciprocatingly moves, following the converter, adjust the degree of opening by moving the needle valve piece toward and away from the valve seat; and that the piston move the fully-closing valve piece, together with the slider, to the flow-path-fully-closed position of the open/close valve.

In this case, the stepper motor may integrally move with the piston.

In the first aspect of the present invention, it is desirable that the reciprocating movement section be provided with a converter that converts rotational movement of the stepper motor to reciprocating movement in an axial direction, a slider that reciprocatingly moves in the axial direction integrally with the needle valve piece by being engaged to a shaft portion of the needle valve piece loosely fitted to the converter, and an elastic member that biases the slider in a direction in which the slider is pressed against the converter; that the opening/closing section is provided with a double-acting piston that moves at an outer surface of the converter by being pressed by the air pressure in one or the other axial direction; that the slider that reciprocatingly moves, following the converter, adjust degree of opening by moving the needle valve piece toward and away from the valve seat; and that the piston move the fully-closing valve piece, together with the slider, to the closed position of the open/close valve.

A flow adjusting valve according to a second aspect of the present invention includes a controller that stops the operation of the reciprocating movement section when the fully-closing valve piece is in the closed position; accordingly, an unnecessary operation of the needle valve is prevented.

In addition, in a flow adjusting valve according to a third aspect of the present invention, air is circulated in a space inside the casing, which accommodates electrical equipment; accordingly, ventilation cooling is performed and an increase in temperature of electrical equipment can be prevented. Furthermore, by performing the ventilation cooling, it is also possible to prevent an increase in temperature of electronic equipment in the casing and that of the fluid due to heat conduction.

With the present invention described above, a flow adjusting valve is formed having an integrated structure provided with a flow adjusting function and a flow-path blocking function; therefore, the installation space in an apparatus can be reduced while maintaining excellent flow reproducibility.

DETAILED DESCRIPTION OF THE INVENTION

Figure 1:
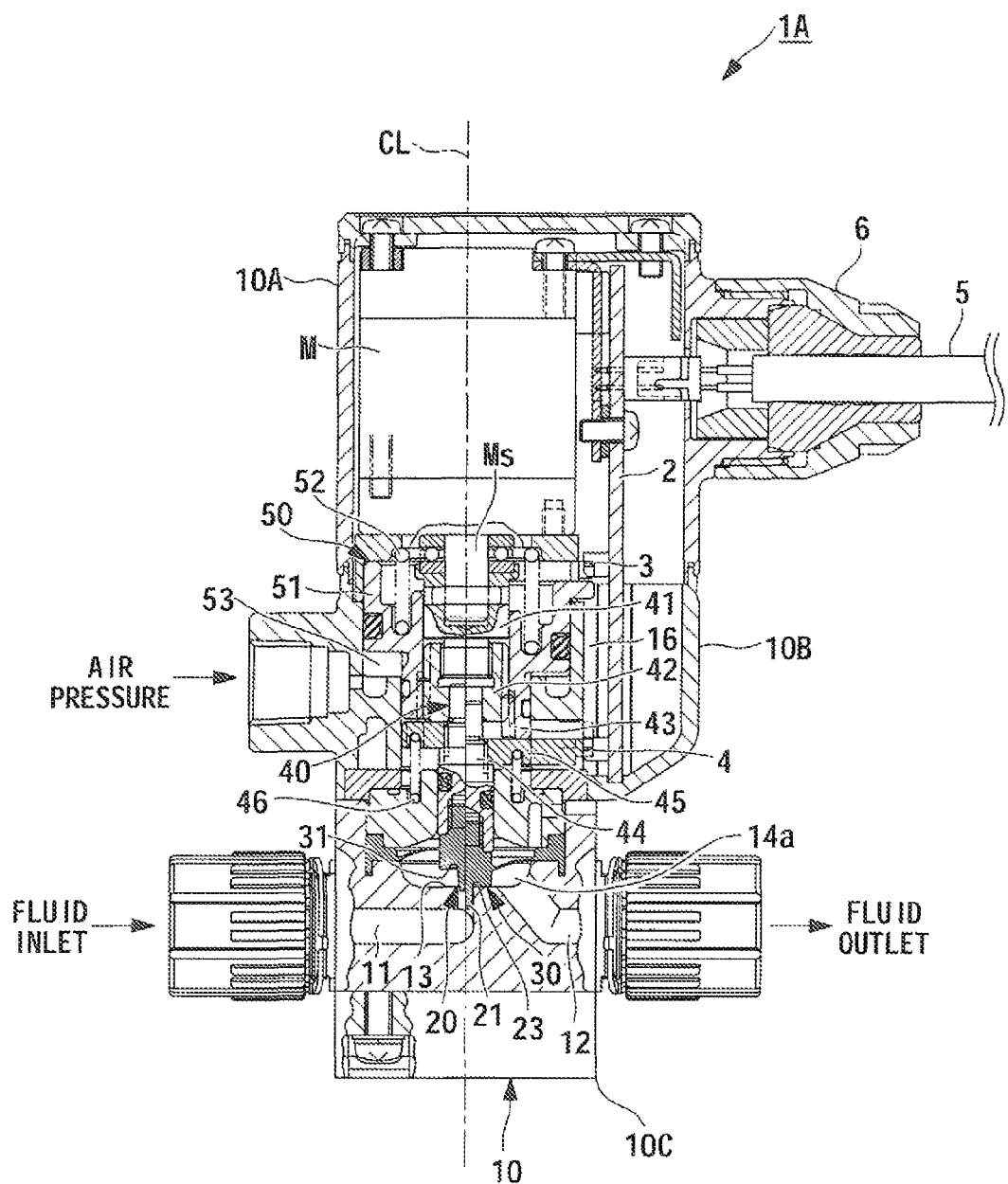
FIG. 1 is a cross-sectional view of the internal structure of a flow adjusting valve according to an embodiment of the present invention; the left half of the drawing shows a state in which both an open/close valve and a needle valve are fully open; and the right half of the drawing shows a state in which the open/close valve is fully closed and the needle valve is fully open.
Figure 2:
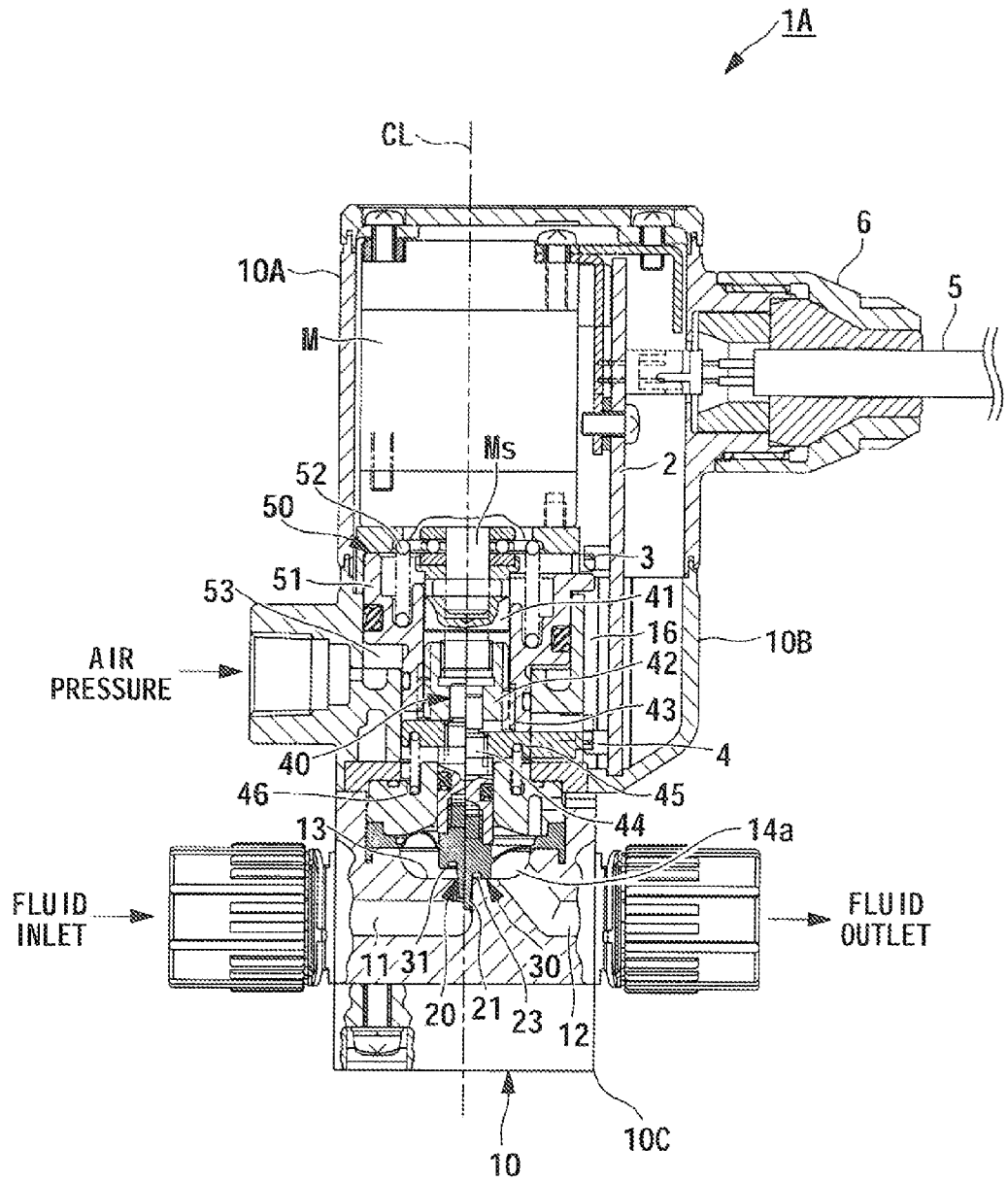
FIG. 2 is a cross-sectional view of the internal structure of the flow adjusting valve shown in FIG. 1; the left half of the drawing shows a state in which the open/close valve is fully open and the needle valve is set to an intermediate degree of opening; and the right half of the drawing shows a state in which the open/close valve is fully closed and the needle valve is set to an intermediate degree of opening.

An embodiment of a flow adjusting valve according to the present invention will be described below on the basis of the drawings.

In this embodiment, descriptions will be given as applied to a flow adjusting valve that adjusts the flow of liquid fluid (chemical) in a semiconductor manufacturing apparatus; however, the flow adjusting valve of the present invention is not limited thereto, and it is also applicable to flow adjusting valves that adjust flows of liquid fluids in other apparatuses, etc.

In a flow adjusting valve 1A of the embodiment shown in FIGS. 1 to 4, a needle valve 20 that adjusts the flow of the liquid fluid and an open/close valve (shutoff valve) 30 that fully closes a flow path of the liquid fluid are accommodated inside a casing 10. In addition, this flow adjusting valve 1A is configured so that the degree of opening of the needle valve 20 is controlled by motion caused by employing a stepper motor (hereinafter, referred to as "motor") M, and, furthermore, so that the open/close valve 30 is fully closed/fully opened by motion caused by using air pressure; therefore, both valves can be remotely controlled.

The casing 10 that forms the external shape of the flow adjusting valve 1A is configured including an upper casing 10A, a middle casing 10B, and a lower casing 10C.

In addition to the needle valve 20 and the open/close valve 30, the casing 10 accommodates a reciprocating movement section 40 that moves a needle valve piece 21 of the needle valve 20 toward and away from a valve seat 13, a fully-closing/fully-opening section 50 that reciprocatingly moves a fully-closing valve piece 31 of the open/close valve 30 between a flow-path-fully-closed position and a flow-path-fully-open position, and a board 2, etc. for various control.

Among these, the valve seat 13 for the needle valve 20 and the open/close valve 30 is formed in the lower casing 10C in addition to an inlet flow path 11 and an outlet flow path 12 through which the liquid fluid flows.

For the fully-closing valve piece 31 of the open/close valve 30, a basal outer circumferential surface 22 of the needle valve piece 21 serves as the fully-closing valve piece 31.

As shown in FIG. 4(a), as a concrete example of the fully-closing valve piece 31, for example, a hollow groove 23 is formed in the basal outer circumferential surface 22 of the needle valve piece 21 which faces the valve seat 13, and the ring-shaped basal outer circumferential surface 22 remaining at an outer side of this hollow groove 23 is used as the fully-closing valve piece 31.

In other words, in the flow adjusting valve 1 of this embodiment, the needle valve 20 that adjusts the flow of the liquid fluid and the open/close valve 30 that fully closes the flow path of the liquid fluid are accommodated inside the casing 10 in which the inlet flow path 11, the outlet flow path 12, and the valve seat 13 are formed. The needle valve 20, on one hand, is provided with the reciprocating movement section 40 for adjusting the flow by moving the needle valve piece 21 toward and away from the valve seat 13. For the open/close valve 30, on the other hand, the hollow groove 23 is formed at the basal outer circumferential surface 22 of the needle valve piece 21 which faces the valve seat 13, thereby making the outer side thereof serve as the fully-closing valve piece 31, and, furthermore, the fully-closing/fully-opening section 50 is provided, which reciprocatingly moves the fully-closing valve piece 31 between the flow-path-fully-closed position, where the valve piece is in close contact with the valve seat 13, and the flow-path-fully-open position, where the valve piece is moved away from the valve seat 13.

Figure 3:
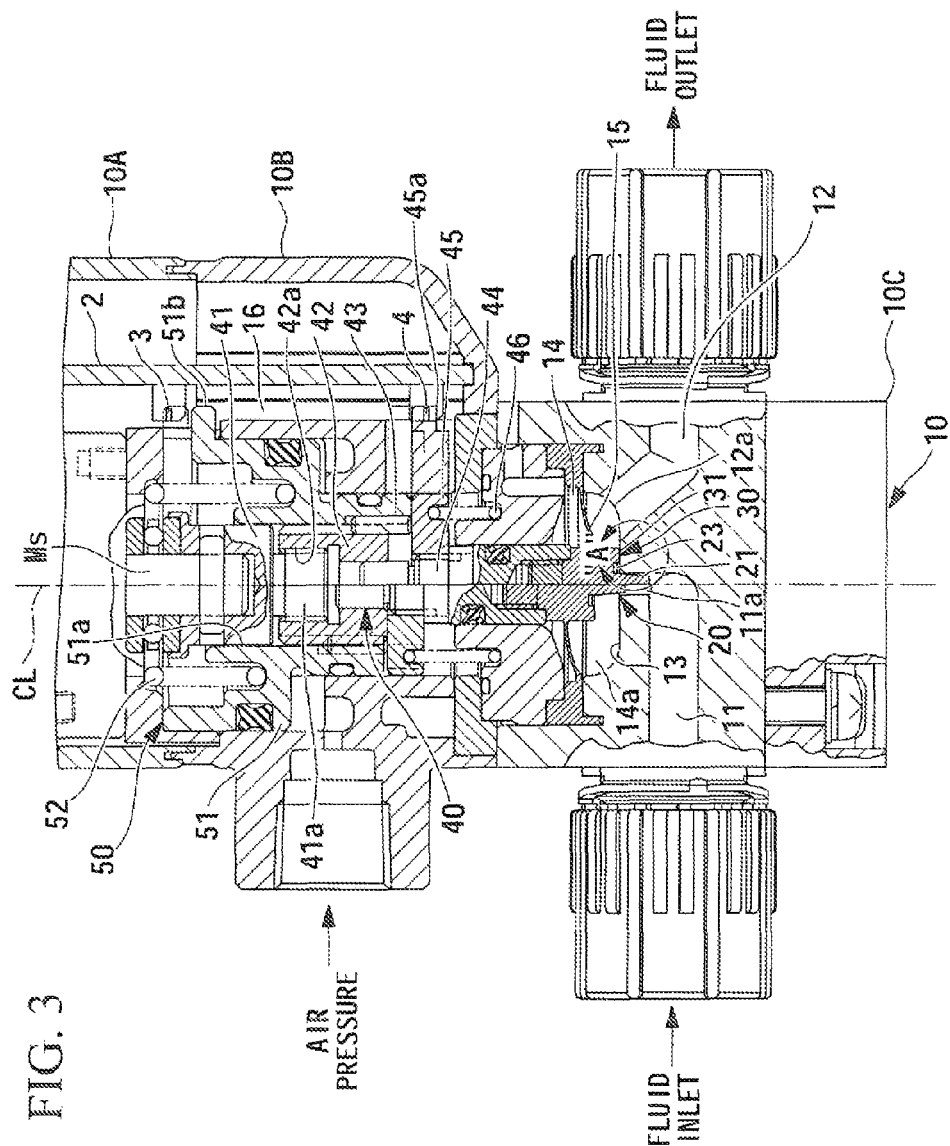
FIG. 3 is an enlarged view of relevant portions (the open/close valve and the needle valve) of FIG. 1.
Figure 4:
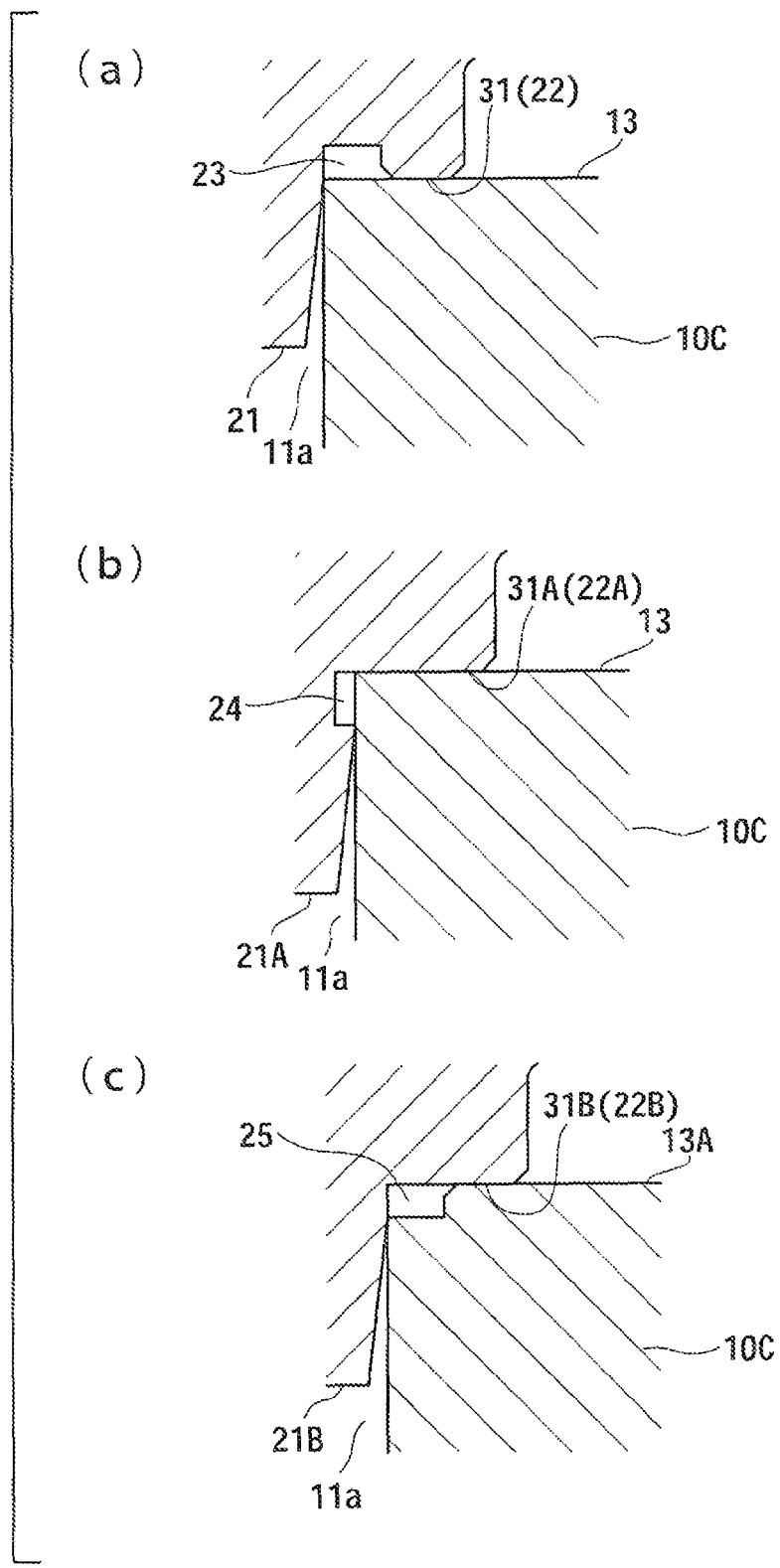
In FIG. 4, (a) is an enlarged view of a portion A in FIG. 3, showing the shapes of the needle valve piece, a fully-closing valve piece, and a valve seat; (b) is a diagram showing a first modification of (a); and (c) is a diagram showing a second modification of (a).

As shown in FIG. 3, the inlet flow path 11 of the flow adjusting valve 1A is horizontally formed from a fluid inlet at the left side of the drawing and is provided with a fluid-flow-path outlet 11a having a cylindrical shape that changes direction upward at an axial center line CL of the flow adjusting valve 1A and that opens at the valve seat 13. This fluid-flow-path outlet 11a is a space into which the needle valve piece 21 intrudes and changes a flow path cross-sectional area (degree of opening of the valve), and the degree of opening is adjusted by changing the amount of intrusion of the needle valve piece 21, which moves toward and away from the vale seat 13 by the movement of the reciprocating movement section 40. With such an adjustment of the degree of opening of the needle valve 20, the flow of the liquid fluid that passes through the flow adjusting valve 1A is adjusted.

Note that the needle valve 20 is configured so as not to come in contact with the valve seat 13 or wall surfaces of the fluid-flow-path outlet 11a at a minimum degree of opening where the needle valve piece 21 intrudes furthest into the fluid-flow-path outlet 11a.

The reciprocating movement section 40 of the needle valve 20 is provided with a mechanism that converts rotational movement to vertical movement relative to a rotational output shaft Ms of the motor M. Specifically, a converter 42, which is a rotating part, is attached to the rotational output shaft Ms of the motor M via a coupling 41.

This converter 42 is in a state in which rotation thereof is prevented by obstructive pins 43 disposed at an outer circumferential portion thereof, and is connected to the motor M via the coupling 41 by having an internal thread of a hollow-groove-inner-circumferential surface 42a formed at a top end of the converter 42 engage with an external thread of a connecting shaft portion 41a protruding from a bottom end of the coupling 41. In this case, at least one pair of the obstructive pins 43 are provided between an inner circumferential surface 51a of a piston 51, which constitutes the fully-closing/fully-opening section 50 of the open/close valve 30, described later, and an outer circumferential surface of the converter 42. That is, because the piston 51 is prevented from rotating relative to the casing 10, the converter 42, whose rotation relative to the piston 51 is prevented by the obstructive pins 43, is also in a state in which it is prevented from rotating relative to the casing 10. Note that the piston 51 in this case is slidable in an axial direction along the obstructive pins 43.

Therefore, with the rotational movement of the motor M of the reciprocating movement section 40, which is fixedly supported to the casing 10, the rotational movement of the rotational output shaft Ms is converted to a linear movement of the converter 42 at an engaging portion of the internal thread of the hollow-groove-inner-circumferential surface 42a and the external thread of the connecting shaft portion 41a. That is, because the external thread of the connecting shaft portion 41a rotationally moves at the same position, the converter 42 which engages with it moves in the axial direction (vertical direction) in accordance with the amount of rotational movement of the rotational output shaft Ms. Accordingly, the needle valve piece 21 that works together with the converter 42 via a slider 45, described later, moves in the axial direction in the fluid-flow-path outlet 11a as in the fully-open position shown in FIG. 1 and the intermediate degree of opening shown in FIG. 2, thereby altering the amount of intrusion.

In addition, a top end of a valve shaft 44, which is a shaft portion whose bottom end is connected to the needle valve piece 21, is loosely fitted to the bottom end of the converter 42.

An external thread is formed around a middle portion of the valve shaft 44, and the slider 45 is attached thereto by engaging an internal thread with this external thread. This slider 45 is a plate-like member that integrally slides together with the valve shaft 44 and has a substantially discoid shape in an outer circumferential direction of the valve shaft 44. In addition, the slider 45 is pushed up by a lower spring 46, which is a compression spring whose bottom end is supported by the lower casing 10C, and is constantly biased upward. Due to such constant biasing by the lower spring 46, the slider 45 follows the movement of the converter 42 and, furthermore, follows the movement thereof, at the engaging portion between the valve shaft 44 and the slider 45, so that the internal thread 42a of the converter 42 is pushed up and comes into close contact with the external thread 41a of the coupling 41; therefore, backlash does not occur at the engaging portion.

Note that, the biasing by the lower spring 46 serves as a biasing force in a direction that fully opens the open/close valve 30; however, it is considerably small compared with a biasing force of an upper spring 52 described later.

A valve main body provided with the needle valve piece 21 is attached at the bottom end of the valve 44 by being engaged therewith.

This needle valve piece 21 is disposed in a lower valve chamber 14a formed by vertically dividing a valve chamber 14 formed in the casing 10 with a diaphragm 15. This lower valve chamber 14a is a space that communicates with the inlet flow path 11 and the outlet flow path 12 for the liquid fluid and that is provided with a flat portion that serves as the valve seat 13. In this case, the valve seat 13 is provided at the bottom surface of the lower valve chamber 14a, which has a circular shape in a plane view, and a peripheral portion of the fluid-flow-path outlet 11a that opens at a center position of the bottom surface of the lower valve chamber 14a serves as the flat portion of the valve seat 13.

In addition, for the outlet flow path 12 of the flow adjusting valve 1A, its inlet opening 12a is provided at a bottom-surface outer circumferential portion of the lower valve chamber 14a.

The needle valve piece 21 is a member that protrudes downward from the bottom surface of the valve main body and that intrudes into the opening of the fluid-flow-path outlet 11a. This needle valve piece 21 has a substantially a truncated cone shape which gradually decreases in diameter at its bottom end; therefore, cross-sectional area of the fluid flow path changes in accordance with the amount of intrusion into the cylindrically-shaped fluid-flow-path outlet 11a. That is, with the fluid flow path of the flow adjusting valve 1A, a minimum flow-path cross-sectional area also changes in accordance with the position (amount of intrusion) of the vertically-moving needle valve piece 21 inserted into the fluid-flow-path outlet 11a; therefore, the flow can be adjusted in accordance with the orifice diameter.

The fully-closing/fully opening section 50 of the open/close valve 30 opens/closes the fully-closing valve piece 31 by moving the piston 51 in the axial direction by being supplied with air pressure. In this case, when the air pressure is not acting on the piston 51, the fully-closing valve piece 31 and the piston 51, which are biased downward by the upper spring 52, are pushed down into the fully closed position in which the fully-closing valve piece 31 is in close contact with the valve seat 13. That is, the open/close valve in this case is a normally-closed pneumatically operated valve.

The piston 51 slides upward by receiving air pressure on the lower surface thereof and moves to the flow-path-fully-open position in which it is moved away from the valve seat 13. During this time, the piston 51 that has received the air pressure overcomes the downward biasing force of the upper spring, whose top end is fixedly supported at the casing 10 side, and slides while compressing the upper spring 52 with the air pressure. Note that, the reference sign 53 in the drawing is a space in a cylinder chamber into which the air pressure is introduced and that is sealed with an O-ring or the like.

On the other hand, when the above-described air pressure is removed, the open/close valve 30 instantly moves to the fully-closed position, in which the fully-closing valve piece 31 is in close contact with the valve seat 13, due to the downward basing of the upper spring 52.

In order to ensure smooth vertical movement, the slider 45 and the piston 51 are provided with protrusions 45a and 51b that fit into vertical-direction guiding grooves 16 provided on the casing 10 side.

Such protrusions 45a and 51b serve to prevent rotations of the slider 45 and the piston 51, and, additionally, the protrusion 51b of the piston 51 activates a shutoff sensor 3 that detects the fully-closed position of the open/close valve 30. This shutoff sensor 3 outputs a signal indicating that the fully-closed position of the open/close valve is detected and prohibits flow control by the needle valve 20. In this case, when the protrusion 51b which protrudes from the piston 51 in a horizontal direction moves down from the fully-open position and moves out of a detection position of the shutoff sensor 3, the signal indicating that the open/close valve 30 is determined to be in the fully-closed position is output.

Note that, the reference sign 5 in the drawing is a cable for a power source or remote control, and 6 is a connecting portion between the flow adjusting valve 1A and the cable 5.

That is, when the open/close valve 30 is at the fully-closed position, the flow of liquid fluid is completely blocked; therefore, a flow control that controls the degree of opening of the needle valve 20 would serve no purpose. Accordingly, when the shutoff sensor 3 detects the fully-closed position of the open/close valve 30, a safety mechanism that prohibits unnecessary flow control by the needle valve 20 is activated. Such a safety mechanism is executed, for example, by software implemented in the control board 2.

Note that, the protrusion 45a of the slider 45 activates a needle sensor 4 that defines the zero positions of the slider 45 and the needle valve 20.

With the thus-configured flow adjusting valve 1A, the needle valve 20 that adjusts the flow and the open/close valve 30 that fully closes the fluid flow path are accommodated in the same casing 10; therefore, an installation space for mounting it in an apparatus can be reduced. In particular, because the valve seat 13 is shared between the needle valve 20 and the open/close valve 30 and, furthermore, because the fully-closing valve piece 31 is formed around the needle valve piece 21, a series structure in which the two types of valves are arranged in a longitudinal direction (axial direction) is obtained; therefore, the projected area in a plane view becomes smaller than with a conventional horizontal arrangement. That is, the above-described flow adjusting valve 1A is configured as an integral structure in which a main flow adjusting structure employing the needle valve 20 that enables precise flow adjustment is provided with a function of completely blocking (fully closing) the flow path with the open/close valve 30.

Moreover, because the flow adjustment by the needle valve 20 by the reciprocating movement section 40 and the fully opening/fully closing of the open/close valve 30 by the fully-closing/fully-opening section 50 are operated independently of each other, a response lag is eliminated and the response time can be shortened.

In addition, the reciprocating movement section 40 described above is provided with the converter 42 that converts the rotational movement of the motor M to the reciprocating movement in the axial direction, the slider 45 that reciprocatingly moves in the axial direction integrally with the needle valve piece 21 by being engaged with the valve shaft (shaft portion) 44 of the needle valve piece 21 loosely fitted to the converter 42, and the lower spring (elastic member) 46 that applies the bias in the direction that presses the slider 45 against the converter 42; the fully-closing/fully-opening section 50 is provided with the piston 51 that moves at the outer circumference of the converter 42 by being pressed upward in the axial direction by the air pressure and the upper spring (elastic member) 52 that biases the piston 51 in the direction in which the piston 51 is pressed and moved downward in the axial direction; the slider 45 that reciprocatingly moves, following the converter 42, adjusts the degree of opening by moving the needle valve 20 toward and away from the valve seat 13; and the piston 51 moves the fully-closing valve piece 31, together with the slider 45, to the flow-path-fully-closed position of the open/close valve 30.

That is, during the normal flow adjustment, the slider 45 that is subjected to the upward bias of the lower spring 46 vertically moves substantially integrally with the converter 42 while following its reciprocating movement. Specifically, when the converter 42 is moving up, the slider 45 follows it by being pushed up by the lower spring 46, and, when the converter 42 is moving down, the slider 45 moves while compressing the lower spring 46.

When the operation for fully closing the open/close valve 30 is performed, however, because the biasing by the upper spring 52, which is greater than the biasing by the lower spring 46, dominates, the slider 45 is pushed down to the flow-path-fully-closed position by the piston 51. Note that, the air pressure supplied to the fully-closing/fully-opening section 50 exhibits a pressing force greater than the biasing force of the upper spring 52; therefore, the piston 51 is maintained in a state in which it is pushed up to the flow-path-fully-open position.

Note that, this embodiment employs a normally-closed configuration in which the open/close valve 30 is fully open when there is no air pressure; however, it is also possible to employ a normally-open configuration by changing, for example, the biasing directions of the elastic members or the air pressure that acts on the piston 51.

In addition, the fully-closing valve piece 31 of the open/close valve 30 described above is not limited to the shape and the configuration of the concrete example shown in FIG. 4(a), and, for example, modifications described below may be employed.

In a first modification shown in FIG. 4(b), a hollow groove 24 is formed at a basal portion of a needle valve piece 21A. That is, the hollow groove 24 is formed over the entire circumference near a top end of the needle valve piece 21A, which protrudes from a fully-closing valve piece 31A of the open/close valve 30. In this case, a basal outer circumferential surface 22A of the needle valve piece 21A is formed as a flat surface, and the fully-closing valve piece 31A is fully closed when the entire surface of the basal outer circumferential surface 22A comes in close contact with the valve seat 13.

In a second modification shown in FIG. 4(c), a step portion 25 is formed at an inner circumferential end of the valve seat 13 described above. That is, the step portion 25 in which a corner portion of the fluid-flow-path outlet 11a is removed in a ring shape is formed, and an outer circumference of the step portion 25 is used as a valve seat 13A; a basal outer circumferential surface 22B of a needle valve piece 21B is formed as a flat surface, and a fully-closing valve piece 31B is fully closed when the entire surface of the basal outer circumferential surface 22B comes in close contact with the valve seat 13A.

Note that, the hollow groove 23, the hollow groove 24, and the step portion 25 described above are not necessarily required, and, when the required precision of the flow adjustment is low, a simple structure may be employed, wherein the flow is adjusted by slopes of the needle valve piece 21, and the open/close valve 30 is fully closed via close contact between the flat valve seat 13 and the basal outer circumferential surface 22.

Figure 5:
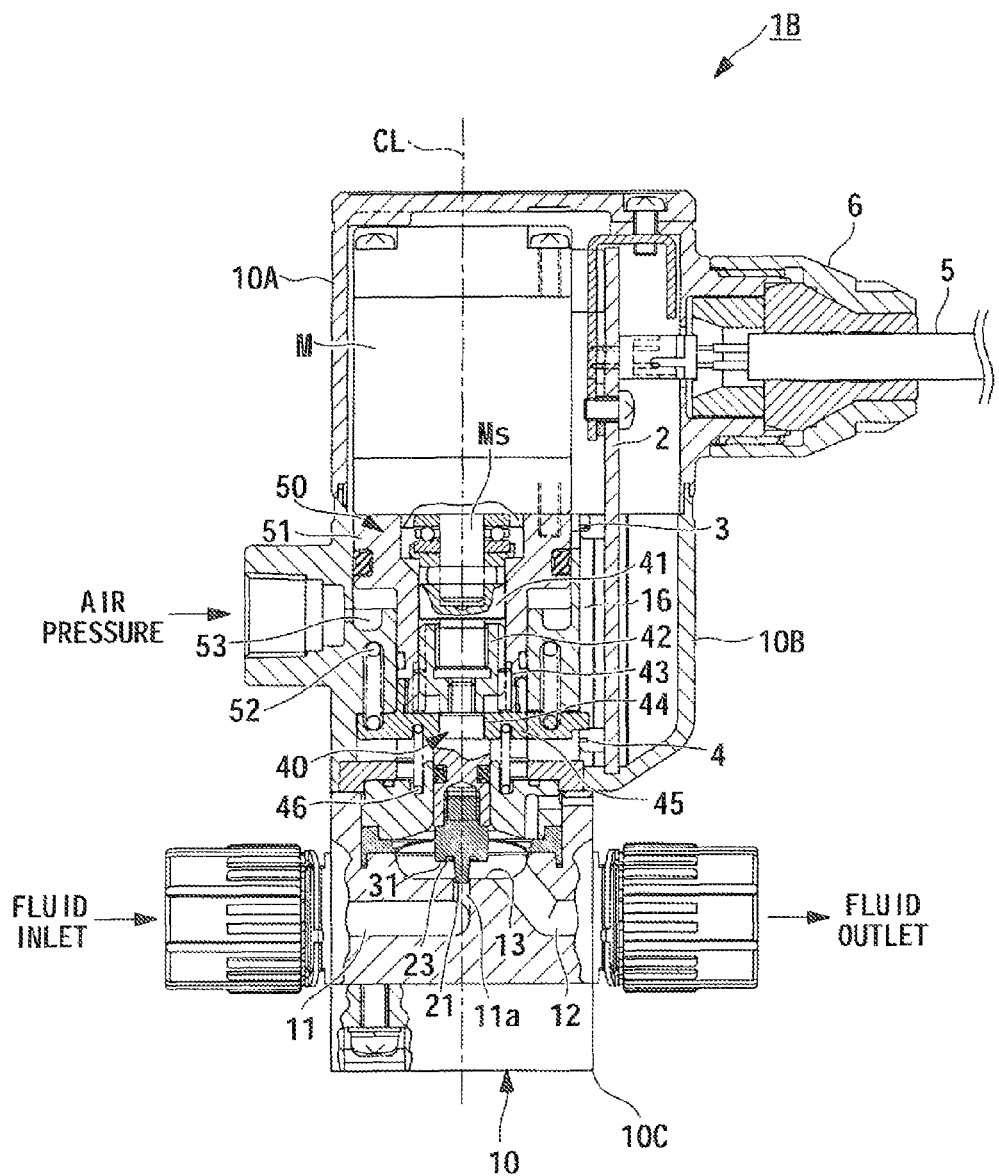
FIG. 5 is a cross-sectional view of the internal structure of a flow adjusting valve according to a first modification of the present invention, showing an example configuration in which a stepper motor vertically moves together with opening/closing of the open/close valve.

In the above-described embodiment, the motor M is fixedly supported by the casing 10; however, as in the first modification shown in FIG. 5, for example, the motor M may be configured so as to integrally move with the piston 51. This flow adjusting valve 1B is practically identical to one in the above-described embodiment with regard to structures other than the structure in which the piston 51 is connected to the motor M so that the motor M reciprocatingly moves in the axial direction integrally with the piston 51.

Figure 6:
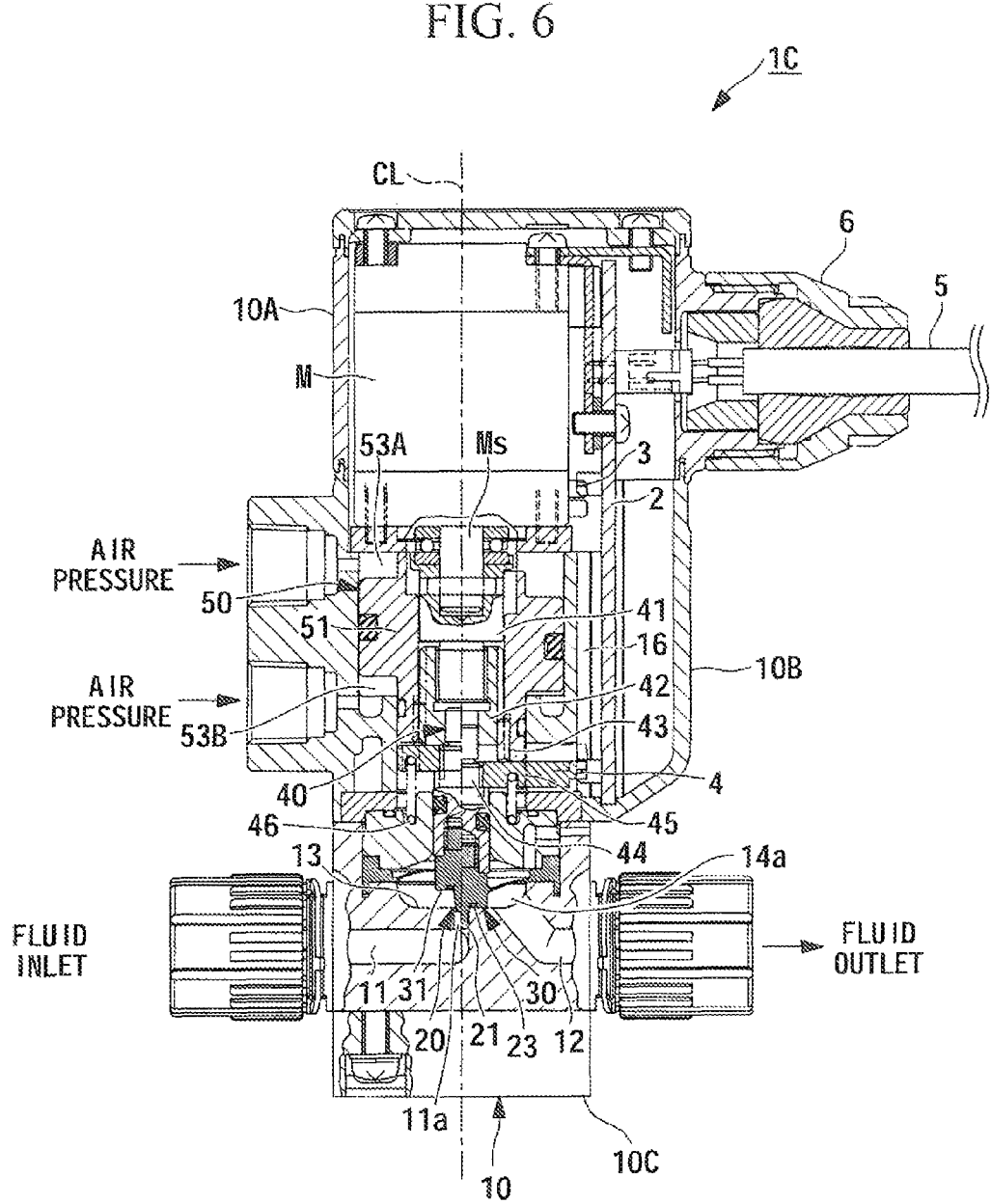
FIG. 6 is a cross-sectional view of the internal structure of a flow adjusting valve according to a second modification of the present invention, showing an example configuration in which the open/close valve is opened/closed by using a double-acting piston.

In addition, instead of the above-described embodiment, for example, a flow adjusting valve 1C of the second modification shown in FIG. 6 may be employed.

In this modification, the reciprocating movement section 40 is provided with, as in the above-described embodiment, the converter 42 that converts the rotational movement of the motor M to the reciprocating movement in the axial direction, the slider 45 that reciprocatingly moves in the axial direction integrally with the needle valve piece 21 by being engaged with the valve shaft 44 of the needle valve piece 21 loosely fitted to the converter 42, and the lower spring 46 that biases the slider 45 in the direction in which the slider 45 is pressed against the converter 42.

However, the fully-closing/fully-opening section 50 is provided with a double-acting piston 51 that moves at the outer circumference of the converter 42 by being pressed with the air pressure in one or the other axial directions; the slider 45 that reciprocatingly moves, following the converter 42, adjusts the degree of opening by moving the needle valve 20 is moved toward and away from the valve seat 13; and the piston 51 moves the fully-closing valve piece 31, together with the slider 45, to the flow-path-fully-closed position of the open/close valve 30.

That is, during the normal flow adjustment, the slider 45 that is subjected to the upward bias from the lower spring 46 vertically moves substantially integrally with the converter 42 following its reciprocating movement; therefore, when the converter 42 is moving up, the slider 45 follows it by being pushed up by the lower spring 46, and, when the converter 42 is moving down, the slider 45 moves while compressing the lower spring 46.

When the operation for fully closing the open/close valve 30 is performed, however, the air pressure is supplied to a cylinder chamber 53A above the piston 51, and the piston 51 is pressed downward by the air pressure, which is greater than the biasing by the lower spring 46. As a result, the slider 45 is pressed down to the flow-path-fully-closed position by the piston 51. Note that, for the operation for fully opening the open/close valve 30, the air pressure should be supplied to a cylinder chamber 53B below the piston 51.

When such a double-acting piston 51 is employed, because opening/closing of the open/close valve 30 can be directly performed with the air pressure, the operations can be reliably performed.

Figure 7:
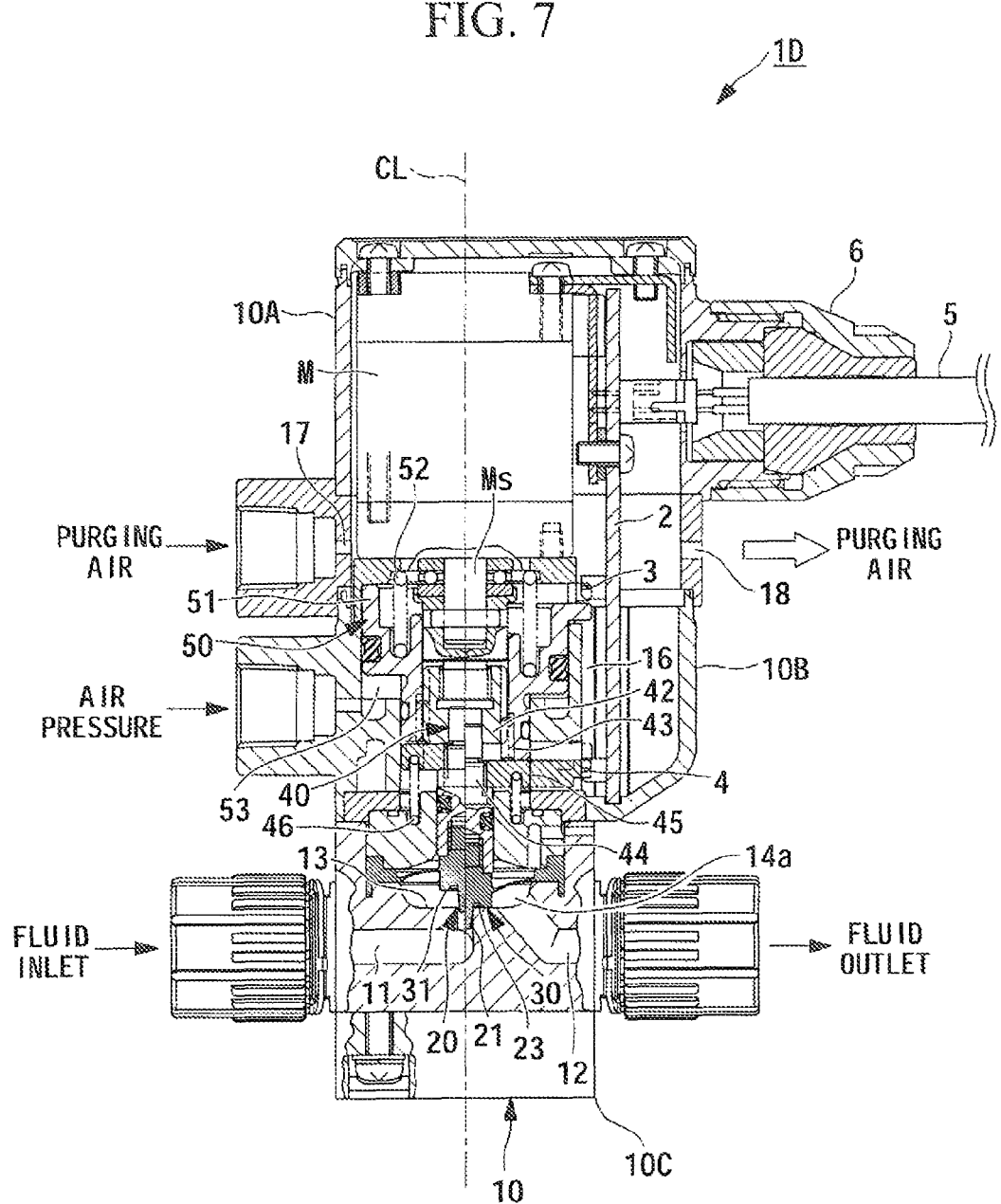
FIG. 7 is a cross-sectional view of the internal structure of a flow adjusting valve according to a third modification of the present invention, showing an example configuration in which cooling is performed by circulating air inside a casing.

In addition, in the embodiment and modifications described above, for example, as in a third modification shown in FIG. 7, it is desirable to circulate purging air (air) in a space in the casing 10 in which electrical equipment is accommodated and to prevent an increase in temperature of the electrical equipment by performing ventilation cooling.

In a flow adjusting valve 1D shown in FIG. 7, an air inlet 17 and an air outlet 18 for the ventilation cooling are provided in the casing 10 of the flow adjusting valve 1A shown in FIG. 1. In the illustrated example configuration, the air inlet 17 and the air outlet 18 are provided at opposing surfaces of the upper casing 10A in which the motor M and the board 2 are accommodated.

As a result, the purging air that has flowed in from the air inlet 17 flows out from the air outlet 18 by passing through the interior of the upper casing 10A; however, during this time, because the air passes through, the surroundings of the motor M and the board 2, which generate heat, an increase in the internal temperature can be suppressed. Therefore, the temperature of electrical equipment or electronic equipment installed in the casing 10, such as the board 2, can be prevented from increasing, and, additionally, a temperature increase due to heat conduction can also be prevented with regard to the temperature of fluid that flows through the flow adjusting valve 1A, such as chemicals, etc.

In this way, with the embodiment and the modifications described above, a flow adjusting valve can be operated as a single flow adjusting valve employing a needle valve, in which the function of an open/close valve is incorporated, and, furthermore, it can be remotely controlled via electrical control or pneumatic control. Therefore, the flow adjustment can be delicately performed by means of a needle valve, and, moreover, it is also possible to completely block fluid (to fully close the valve).

In addition, because the flow adjusting valve and the open/close valve are arranged in a series structure, the structure can be installed if enough space for installing a single unit of the flow adjusting valve can be ensured.

Furthermore, although a response lag occurs in a flow adjusting valve having a conventional structure due to on/off operation of a motor, because the operational mechanism of the open/close valve is separated, the response time during repeated opening/closing operations or an instantaneous fully closing operation, etc. can be shortened.

In addition, because the safety mechanism is provided, with which the flow adjustment via the needle valve cannot be performed in an operational state in which the open/close valve is fully closed, it is possible to avoid a loss of synchronism in the stepper motor, which provides the motive power.

Also, because the open/close valve is externally operated with air pressure, the fully-closed state, which can completely block fluid, can be achieved regardless of the position of the needle valve within the operational range thereof.

Furthermore, in the above-described configuration, the converter, which is a vertical movement conversion mechanism, is installed inside the cylinder that opens/closes the open/close valve; therefore, it is possible to make the flow adjusting valve compact.

Finally, the needle valve that performs the flow adjustment has a structure in which the needle valve piece does not come in contact with the fluid-flow-path outlet that serves as a valve orifice, and, moreover, the fully-closing valve piece of the open/close valve also has a structure that does not intrude into and come in contact with the fluid-flow-path outlet; therefore, the shape of the valve orifice for the flow adjustment does not become deformed, and thus, a flow adjusting valve with excellent flow reproducibility is obtained.

Note that, the present invention is not limited to the above-described embodiment, and appropriate alterations are possible within a range that does not depart form the sprit thereof.

What is claimed is:

1. A flow adjusting valve in which a needle valve that adjusts the flow of liquid fluid and an open/close valve that makes it possible to fully close a flow path of the liquid fluid are accommodated inside a casing in which a fluid flow path and a valve seat are formed, wherein:
    the needle valve is provided with a reciprocating movement section that adjusts the flow of the liquid fluid that flows in the flow path by moving a needle valve piece toward and away from the valve seat and that is driven by a stepper motor;
    the open/close valve is provided with an opening/closing section driven by air pressure that utilizes a basal outer surface of the needle valve piece facing the valve seat as a fully-closing valve piece and that reciprocatingly moves the fully-closing valve piece, independently of the reciprocating movement section, between a closed position, where the fully-closing valve piece is in close contact with the valve seat, and an open position, where the fully-closing valve piece is moved away from the valve seat;
    the reciprocating movement section is provided with a converter that converts rotational movement of the stepper motor to reciprocating movement in an axial direction, a slider that reciprocatingly moves in the axial direction integrally with the needle valve piece by being operatively connected with a shaft portion of the needle valve piece loosely fitted to the converter, and an elastic member that biases the slider in a direction in which the slider is pressed against the converter;
    the opening/closing section is provided with a piston that moves at an outer surface of the converter by being pressed by the air pressure in one of the axial directions and an elastic member that biases in a direction that moves the piston by pressing the piston in the other axial direction;
    the slider that reciprocatingly moves, the converter, adjusts the degree of opening by moving the needle valve piece toward and away from the valve seat; and
    the piston moves the fully closing valve piece to the flow path fully closed position of the open/close valve.

2. A flow adjusting valve according to claim 1, wherein the stepper motor integrally moves with the piston.

3. A flow adjusting valve according to claim 1, comprising a controller that stops the operation of the reciprocating movement section when the fully-closing valve piece is in the closed position.

4. A flow adjusting valve according to claim 1, wherein air is circulated in a space inside the casing, which accommodates electrical equipment.

5. A flow adjusting valve, comprising:
    a casing defining a fluid flow path and including a valve seat formed therein;
    a needle valve within the casing and having a needle valve piece, the needle valve including a reciprocating movement section that adjusts the flow of liquid fluid that flows in the flow path by moving the needle valve piece toward and away from the valve seat and that is driven by a stepper motor; and
    an open/close valve within the casing for fully closing the flow path, the open/close valve including an opening/closing section driven by air pressure that utilizes a basal outer surface of the needle valve piece facing the valve seat as a fully-closing valve piece and that reciprocatingly moves the fully-closing valve piece, independently of the reciprocating movement section, between a closed position wherein the fully-closing valve piece is in close contact with the valve seat and an open position wherein the fully-closing valve piece is moved away from the valve seat;
wherein:
    the reciprocating movement section includes a converter that converts rotational movement of the stepper motor to reciprocating movement in an axial direction;
    the needle valve piece includes a shaft portion loosely fitted to the convertor: and the flow adjusting valve further includes:
        a slider operatively connected the shaft portion of the needle valve piece for reciprocating movement therewith; and
        an elastic member for biasing the slider against the converter.

6. The flow adjusting valve according to claim 5 wherein:
    the converter includes an outer surface;
    the opening/closing section includes:
        a piston that moves in a first direction at the outer surface of the converter in response to the air pressure; and
        an elastic member engageable with the piston for urging the piston in a second direction opposite to the first direction;
    the slider reciprocatingly moves, following the converter, to adjust the degree of opening by moving the needle valve piece toward and away from the valve seat; and
    the piston moves the fully-closing valve piece to the flow-path-fully-closed position of the open/close valve.

7. The flow adjusting valve according to claim 6 wherein the stepper motor integrally moves with the piston.

8. The flow adjusting valve according to claim 5 wherein:
    the opening/closing section includes a double-acting piston movable in a first direction at the outer surface of the converter in response to the air pressure;
    the slider that reciprocatingly moves, following the converter, adjusts degree of opening by moving the needle valve piece toward and away from the valve seat; and
    the piston moves the fully-closing valve piece to the closed position of the open/close valve.

9. The flow adjusting valve according to claim 5 further comprising a controller operatively connected to the needle valve for stopping operation of the reciprocating movement section when the fully-closing valve piece is in the closed position.

10. The flow adjusting valve according to claim 5 further comprising means for generating air circulation within the casing.

* * * * *